June 26, 1956     E. R. HAMILTON     2,751,899
ADJUSTABLE GRILL FOR OUTDOOR FIREPLACES
Filed April 17, 1953     2 Sheets-Sheet 1
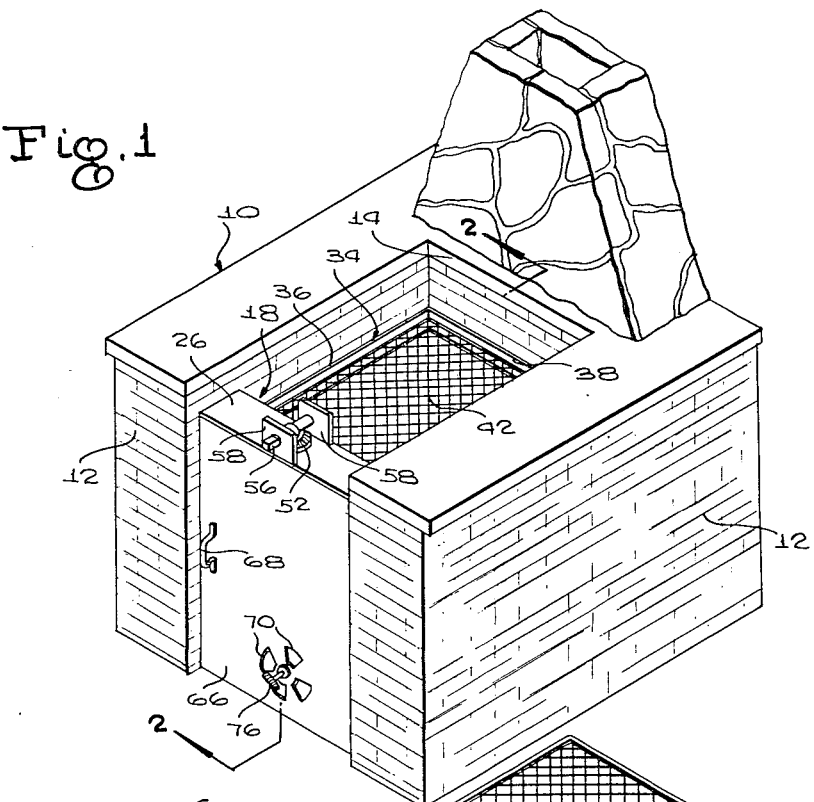
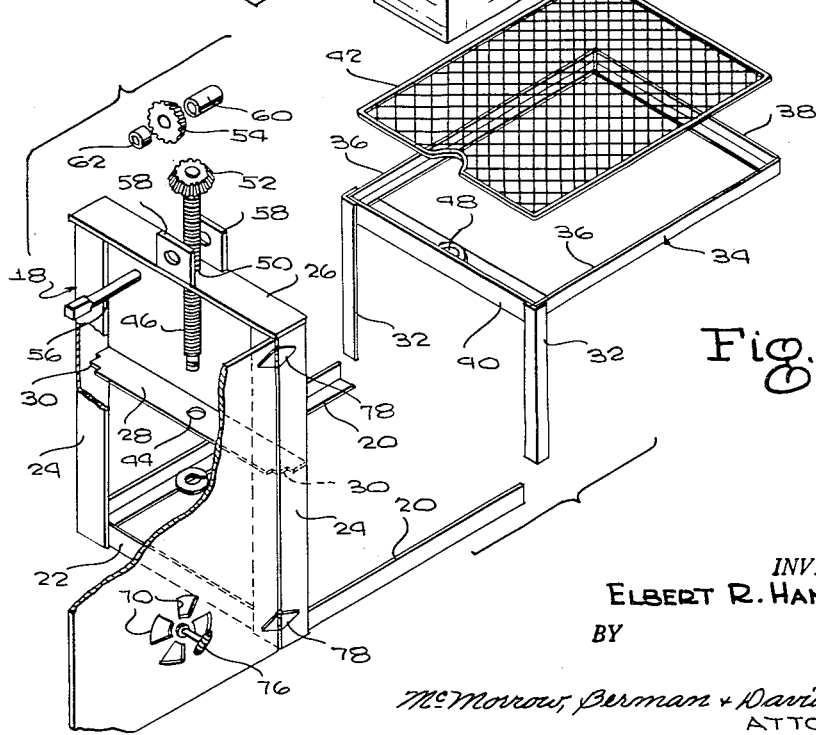
INVENTOR.
ELBERT R. HAMILTON
BY
McMorrow, Berman & Davidson
ATTORNEYS June 26, 1956     E. R. HAMILTON     2,751,899
ADJUSTABLE GRILL FOR OUTDOOR FIREPLACES
Filed April 17, 1953     2 Sheets-Sheet 2
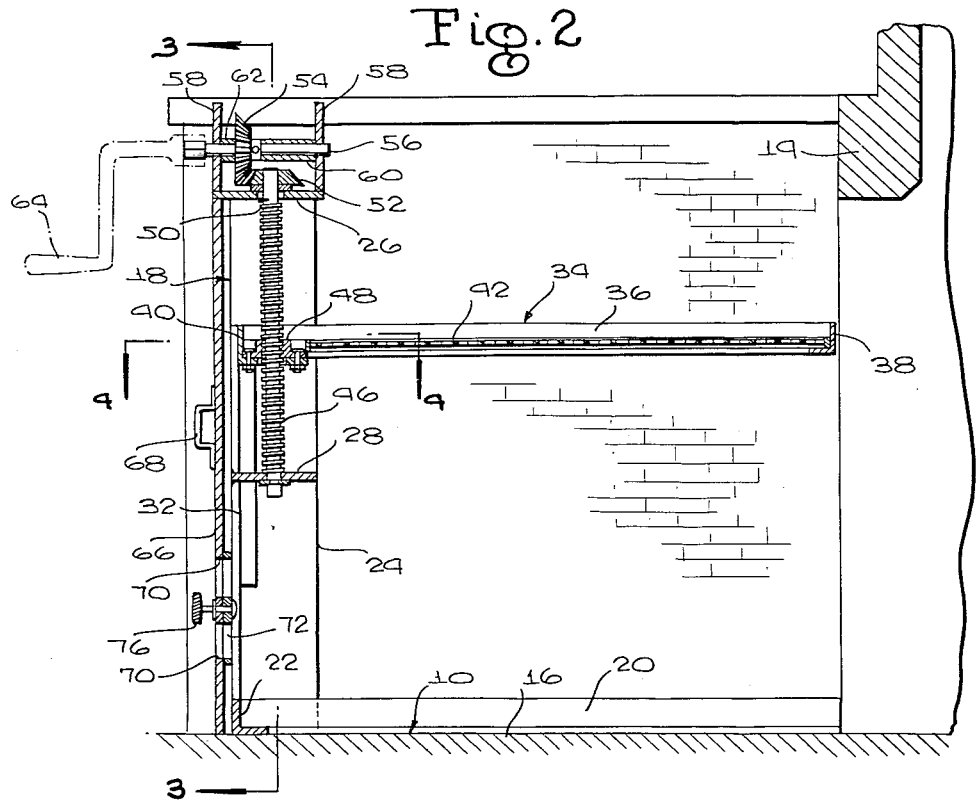
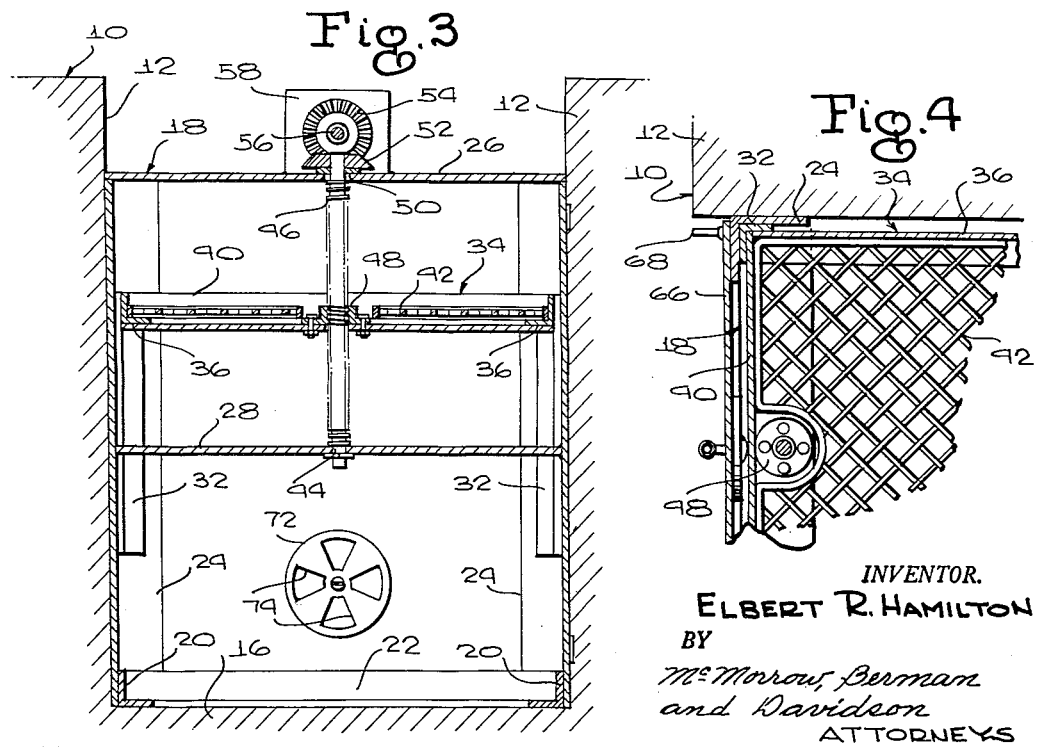
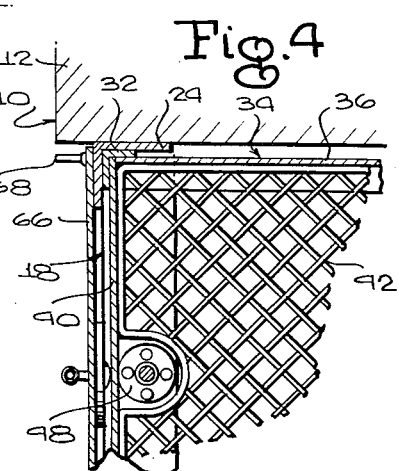
INVENTOR.
ELBERT R. HAMILTON
BY
McMorrow, Berman
and Davidson
ATTORNEYS United States Patent Office 2,751,899
Patented June 26, 1956

2,751,899

ADJUSTABLE GRILL FOR OUTDOOR FIREPLACES

Elbert R. Hamilton, Austin, Tex.

Application April 17, 1953, Serial No. 349,373

1 Claim. (Cl. 126—25)

This invention relates to barbecue grills or the like, and more particularly has reference to an adjustable grill adapted for mounting in a conventionally designed outdoor fireplace.

One important object is to provide a grill of the type stated wherein a food-supporting grill member will be adjustable vertically of the fireplace opening in which it is mounted, thereby to facilitate the location of the grill at the optimum level for cooking a particular article of food supported thereupon.

Another object of importance is to provide an adjustable grill as stated, which is so designed as to comprise a unitary assembly that can be readily mounted in a conventionally constructed barbecue pit or outdoor fireplace.

Still another object of importance is to provide a barbecue grill the moving parts of which can be readily disassembled from one another, thereby to facilitate cleaning, maintenance, and replacement of said grill.

Still another object is to provide an adjustable grill for fireplaces wherein the manually operable means for effecting vertical adjustments are so disposed as to eliminate the necessity of one's bending over the fireplace opening into the smoke emanating therefrom, or burning or soiling his hands in making the desired adjustment as to the level of the grill above the bottom of the opening.

Yet another object is to provide an adjustable grill as stated which will be so designed as to facilitate complete removal of the food-supporting grill member from an associated frame work, to permit said grill member to be cleaned easily after each use.

Other objects will appear from the following description, the claim appended thereto, and from the annexed drawings, in which like reference characters designate like parts throughout the several views, and wherein:

Figure 1 is a perspective view of an outdoor fireplace equipped with an adjustable grill formed in accordance with the present invention;

Figure 2 is a longitudinal sectional view taken on line 2—2 of Figure 1, the scale being enlarged;

Figure 3 is a transverse sectional view on line 3—3 of Figure 2;

Figure 4 is a fragmentary, enlarged sectional view on line 4—4 of Figure 2; and

Figure 5 is a fragmentary, exploded perspective view of the adjustable grill per se.

An outdoor fireplace has been designated generally by the reference numeral 10, and is of basically conventional design, including transversely spaced vertically disposed side walls 12 connected at their rear ends by a vertical back wall 14 extending therebetween. The fireplace is provided with the usual concrete or brick base 16, and as will be noted there is thus defined a fireplace opening in which can be inserted the unitary assembly constituting the present invention.

The invention has been designated generally at 18, and includes a stationary support frame adapted to be secured immovably within the fireplace opening. The support frame has, at its lower end, transversely spaced, horizontally extending base members 20, said base members extending along the lower ends of the side walls 12, from front to rear of the fireplace opening. At this point, it will be understood that the base members could, if desired, be cemented in place or otherwise permanently mounted in the fireplace 10.

Extending between and rigidly secured to the front ends of the base members 20 is a transversely disposed end member 22, said end member 22 being supported upon the base 16 of the fireplace at the open front end of the fireplace opening.

At the juncture of the base members 20 and end member 22, there are mounted upstanding, vertical posts 24 which, like the members 20 and 22, can be formed of angle iron material. The posts 24 are extended upwardly along the respective side walls 12 of the fireplace opening, and terminate at their upper ends in closely spaced relation to the open upper end of the fireplace opening.

The posts 24, as will be appreciated, are welded or otherwise fixedly secured at their lower ends to the base members 20. Affixed at its opposite ends to the upper ends of the posts 24, and extending horizontally between the posts, is an upper cross member 26, spaced vertically above a lower cross member 28 also made rigid at its ends with the posts 24, at a location intermediate the opposite ends of said posts 24.

The opposite ends of the lower cross member 28 have angular recesses 30, defining, in cooperation with the posts 24, angular guideways in which are slidably mounted the depending vertical legs 32 of a grill frame designated generally at 34.

The grill frame 34 includes a horizontally disposed, open, rectangular frame work having side members 36, a transverse rear member 38, and a transverse front member 40. The members 36, 38, 40, as well as the depending legs 32, are all formed of stout angle iron material, and removably supported upon the open frame work is a rectangular grill member 42. The grill member 42 is adapted for supporting any of various articles of food to be barbecued within the fireplace.

By reason of the construction so far illustrated and described, it is seen that the device includes a stationary support frame, with a grill frame 34 being slidably mounted upon said support frame for vertical adjustment.

In the midlength part of the lower cross member 28 I form a smooth walled opening 44, receiving the reduced lower end of a vertically extended adjusting screw 46. Adjusting screw 46, intermediate its ends, is threadedly engaged in the complementarily threaded opening of a block 48 mounted upon the midlength portion of the front transverse member 40 of the vertically shiftable grill frame 34.

At its upper end, the screw 46 has a reduced, smooth walled portion rotatable within a center opening 50 of the upper cross member 26. The opening 50 is sufficiently great in diameter to permit removal of the entire screw, in the manner shown in Figure 5, whenever the device is to be disassembled for purpose of maintenance or cleaning.

The reduced upper end portion of the screw 46 projects above the cross member 26 as shown in Figure 2, and affixed to the upwardly projecting part of the screw is a bevel gear 52 in mesh with a bevel gear 54 secured to a horizontally disposed shaft 56 journaled at its opposite ends in spaced, upstanding bearing plates 58 carried by the upper cross member 26 and fixedly secured to said upper cross member.

The shaft 56 is held in proper position within its associated bearing plates 58 by means of sleeves 62, 60, said sleeves comprising spacer members that will insure the retention of gear 54 in a proper position in which it will remain in mesh with the gear 52.

The shaft 56, at one end, projects laterally of the stationary support frame, said end of the shaft 56 having a non-circular portion engageable in the complementarily formed socket of a hand crank 64. Rotation of the hand crank is effective to transmit rotatable movement to the meshing gears 52, 54, and rotary movement will, in turn, be transmitted to screw 46, thereby to effect vertical adjustment of the grill frame and its grill member 42 upwardly or downwardly, to selected levels.

A door 66 is mounted upon the stationary support frame, and as shown in Figure 1 is so proportioned as to close the front end of the fireplace opening. Door 66 has, adjacent one side edge, a handle 68, to facilitate opening or closing thereof, and at its lower end has circumferentially spaced draft openings 70 behind which is rotatably mounted a circular damper 72 having circumferentially spaced openings 74. The damper 72 has a handle 76 accessible to a user to permit the damper 72 to be rotated to selected positions, thereby to adjust the draft.

The door 66 is hinged as at 78 upon one of the posts 24 so as to swing between fully open and fully closed positions.

It is important to note that the door 66 rises to the level of the upper cross member 26 and as a result, the door will completely close the front end of the fireplace, between the grill member 42 and the base 16 of the fireplace, even when the grill member has been adjusted to its uppermost point. Further, it is important to note that the damper means of the door is disposed below the lowermost position of adjustment of the grill member 42. By reason of these features, a proper draft below the grill member will be assured, in every position to which the grill member is vertically adjusted.

It will be understood that the gears 52, 54 can be in selected ratio to one another, to produce a speed of rotation of the screw 46 greater than the speed of rotation of the crank-operated shaft 56, as desired.

It is also believed to be an important characteristic of the invention that the structure can be disassembled substantially completely for purpose of cleaning or repair. This characteristic of the invention is shown to advantage in Figure 5 in which it is seen that not only can the grill member 42 be readily removed without disturbing other parts of the structure, but also the gears 52, 54, and screw 46, can all be separated from one another and from the remaining parts of the grill.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A grill for an outdoor fireplace comprising a stationary support frame having two transversely spaced horizontal base members, an end member connected at each end to each of said base members at the ends thereof, said end members being adapted and arranged to be disposed at the lower ends of the side walls of a fireplace from front to rear of the opening thereof, with said end member disposed at the open front end, upstanding angularly shaped vertical posts connected one each at its lower end to said base members at the junction of each base member with said end member, a horizontally disposed upper cross member secured at its ends to said posts at their upper ends, a horizontally disposed lower cross member secured at its ends to said posts midlength thereof, said lower cross member having an angularly formed recess at each of its ends forming a guideway with each of said posts; a grill frame having spaced apart side members and front and rear transverse members defining a rectangular open frame work, a vertically depending leg secured at each end of said front transverse member and being slidable one each in said guideways, a vertically extending screw journaled at its lower end in said lower cross member and at its upper end in said upper cross member midlength of each, a first bevel gear secured on the upper end of said screw, a second bevel gear rotatably supported on said upper cross member and being in mesh with said first bevel gear, a block secured to said front transverse member midlength thereof and being formed with a threaded opening adapted to receive said screw, said block being operable to vertically adjust said grill frame in response to rotatable movement of said screw and said bevel gears; and a grill member removably supported on said grill frame.

References Cited in the file of this patent

UNITED STATES PATENTS

| | | |
|---|---|---|
| 575,185 | Weber | Jan. 12, 1897 |
| 1,657,226 | Neldner | Jan. 24, 1928 |
| 1,777,529 | Neldner | Oct. 7, 1930 |
| 2,057,780 | Kahn | Oct. 20, 1936 |
| 2,365,390 | Burmeister | Dec. 19, 1944 |
| 2,608,149 | Ellis | Aug. 26, 1952 |